Oct. 7, 1941.  R. A. HETZER  2,258,360
VALVE REGULATING APPARATUS
Filed Nov. 19, 1938  4 Sheets-Sheet 1

INVENTOR
RUSSELL A. HETZER
BY
Hyde, Higley & Meyer
ATTORNEYS

INVENTOR
RUSSELL A. HETZER
BY Hyde, Higley & Meyer
ATTORNEYS

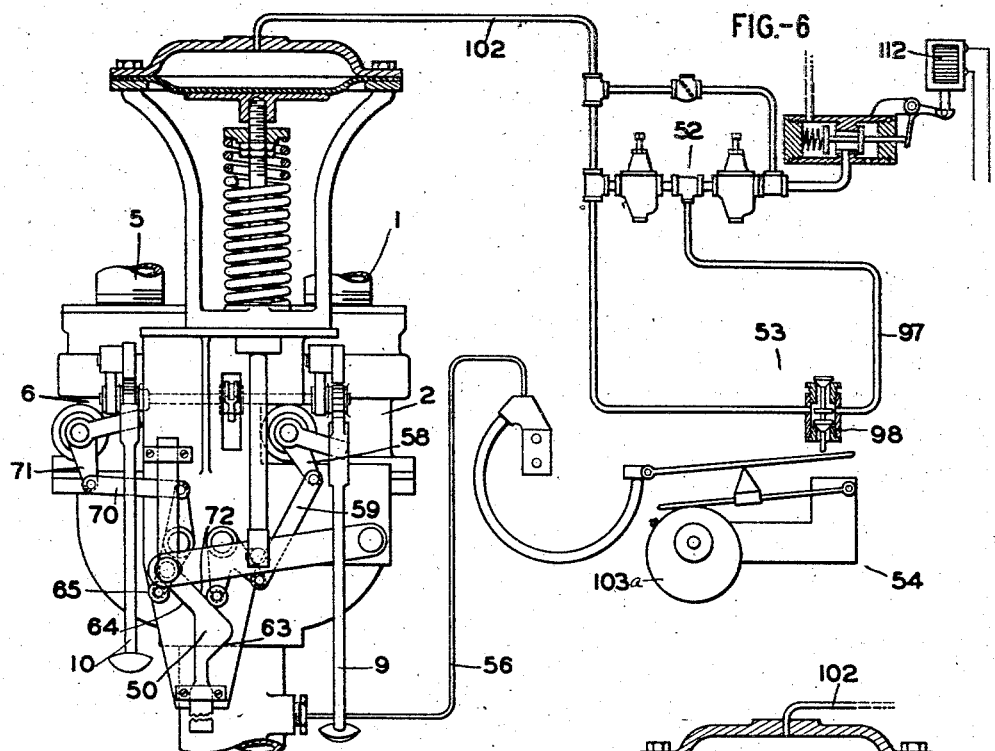
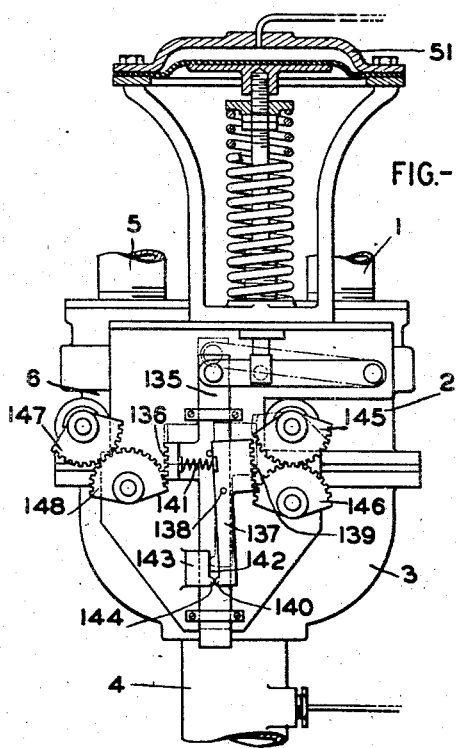
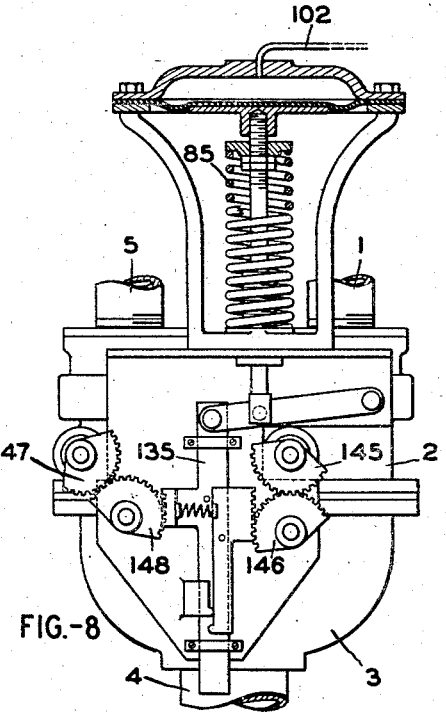

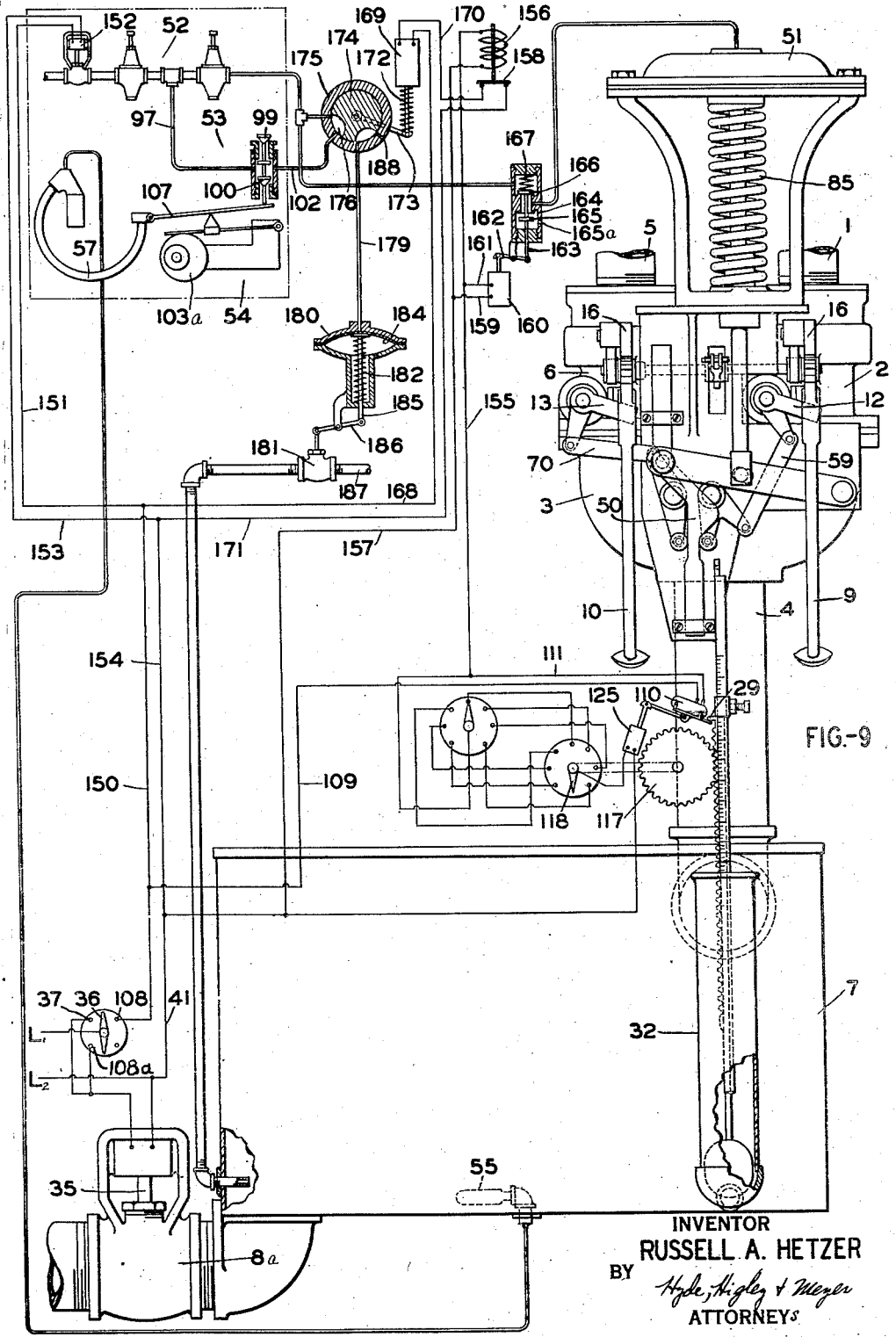

Patented Oct. 7, 1941

2,258,360

UNITED STATES PATENT OFFICE 2,258,360

VALVE REGULATING APPARATUS

Russell A. Hetzer, Cincinnati, Ohio, assignor to The American Laundry Machinery Company, Norwood, Ohio, a corporation of Ohio Application November 19, 1938, Serial No. 241,480

8 Claims. (Cl. 236—12)

My invention relates to apparatus for controlling the flow and for regulating the physical properties of fluid delivered from a plurality of sources. More particularly, it relates to improved apparatus for controlling the supply and regulating the temperature of hot and cold liquids to be mixed and delivered to a common conduit or chamber, including means for maintaining the delivered mixture at a desired temperature.

Generally, the physical properties, such as temperature, of a mixture of fluids have been regulated by valve means interposed in the conduit means for each fluid source, which valve means is usually operated manually or by means of a diaphragm or other servo-motor. Such regulation, however, does not always deliver fluid having the desired physical properties. For instance, when it is desired to provide water having a fairly warm temperature as a mixture from hot and cold sources of supply, the hot water valve may be opened approximately 25% and the cold water valve approximately 75%. In such case 100% flow of water may be delivered at the desired temperature. However, if the pressure or temperature of either source varies, upsetting the ratio of hot and cold water, the final temperature of the mixture is different from that desired and expected.

It is the purpose of my invention to provide improved apparatus by means of which the physical properties of a fluid mixture delivered from a plurality of sources of supply differing in kind, may be regulated by proportionate regulation of the quantities of the respective kinds. While for purposes of illustration, the apparatus will be described in connection with the temperature regulation of a water mixture, I do not desire to be so limited, since the apparatus may be employed for other purposes, such as for controlling the strength of a brine solution formed by mixing a saturated brine solution and water, or for the operation of dampers in hot or cold air supply lines leading to a drying chamber, or for blending fluids having different specific gravities, viscosities, or other physical properties.

My improved apparatus also uses the same valve devices both for permitting both sources of fluid supply to close and for opening one source while the other is maintained closed, or for proportionally opening both sources, and the operating parts are arranged in such a manner that the apparatus may be either manually or automatically operated.

It is therefore an object of my invention to provide improved apparatus having associated valve means arranged to control the flow of fluid from a plurality of sources of supply to a common chamber or conduit where the physical properties of the delivered fluid may be that of either source alone, or of any desired mixture from both sources.

Another object of my invention is to provide improved apparatus having valve means so arranged that the flow of water from hot and cold sources to a mixing chamber or conduit may be desirably controlled so that either hot or cold water alone or any desired mixture of the two may be delivered and be maintained at any desired temperature, irrespective of variations in the temperature or pressure of either source of supply.

A further object of my invention is to provide improved apparatus for operating a self-closing valve in such a manner that it may be gradually opened and gradually closed.

A further object of my invention is to provide improved apparatus having valve means associated therewith in such a manner that the flow of fluid from a plurality of sources of supply to a mixing conduit or chamber may be automatically regulated in combination with improved means for manually operating the valve means when desired.

A further object of my invention is to provide improved apparatus for controlling and regulating the delivery of a liquid to a container at a predetermined temperature until the surface of the liquid reaches the desired level and for shutting off the delivery of liquid at the desired level, including means for supplying a heating medium, as required, to maintain the liquid in the container at the desired temperature.

My invention will be better understood by reference to the accompanying drawings, in which Fig. 1 is a front elevation illustrating one form of my improved apparatus associated with a container, parts of the apparatus being shown in section and the container being shown broken away;

Fig. 6 is a view similar to Figs. 4 and 5, in which the valve-operating device is in position to reverse the open and closed positions of the valves, as compared with Fig. 4;

Fig. 7 is an elevational view of a portion of the apparatus illustrated in Figs. 4, 5 and 6, but showing a modified form of valve-operating device in a position to maintain open the valve controlling one fluid supply source, the valve controlling the other source being closed;

Figures 1, 2, 3:
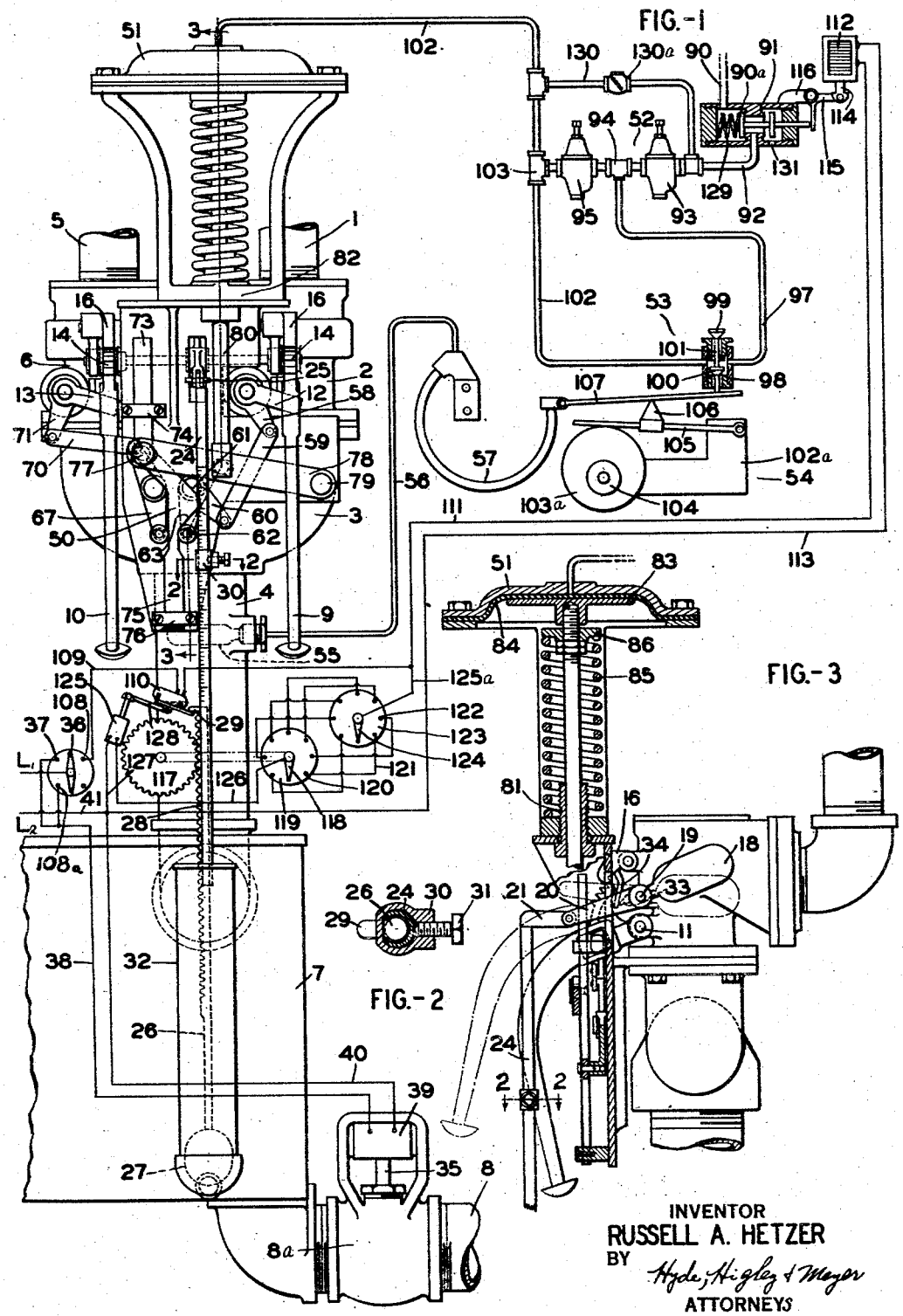
Fig. 2 is a cross-sectional view on the line 2—2, Fig. 1 and Fig. 3.
Fig. 3 is a cross-sectional view on the line 3—3 of Fig. 1.

Fig. 8 is a view similar to Fig. 7 in which the operating device is in position to reverse the open and closed positions of the valves as compared with Fig. 7; and Fig. 9 is an elevational view of a container having delivery and drain pipes, showing my improved apparatus for delivering a liquid mixture to the container at a predetermined temperature, including means for maintaining the liquid at the desired temperature, some of the valve parts being shown in section and parts of the container being broken away to show internal structure.

While my improved apparatus may be utilized for controlling and regulating the delivery of fluid of any type from a plurality of sources of supply for any desired purpose, such as for use in washers, cleaning machines, shower baths or the like, it is shown in the drawings associated with valves, one of which controls the flow of fluid from a cold water source and the other from a hot water source. As illustrated, 1 designates a cold water pipe controlled by any suitable self-closing valve, such as a piston valve, mounted in casing 2, which pipe communicates with a casing 3 having a chamber which communicates with a delivery pipe 4, and 5 designates a hot water pipe controlled by a self-closing valve, such as a piston valve, arranged in casing 6 which also communicates with the casing 3. As illustrated, the delivery pipe 4 communicates with a container 7 having a drain pipe 8 provided with valve 8a which is normally maintained in open position, but may be closed by moving switch 36 to engage terminal 37 or 108a. The structure as thus described, is well known in the art and serves merely as an example to illustrate the application of my improved apparatus. For instance, by slightly modifying the rotary switch the valve 8a may be maintained in normally closed position and opened by the operation of the switch.

As illustrated in Figs. 1 to 6 inclusive and 9, of the drawings, the valves may be operated either manually or automatically, and while it is the principal purpose of my invention to provide means for automatically regulating the physical properties of a fluid delivered to a conduit or chamber from a plurality of sources of supply, it is frequently desirable to secure manual operation or control, although the structure is designed primarily for automatic control.

For manually operating the valves a pair of handles 9 and 10 are provided, handle 9 being pivotally mounted on valve casing 2 and handle 10 on valve casing 6, as at 11, Fig. 3. The handle 9 is apertured to receive the arm of a crank 12 attached to one of the valve plugs (not shown), and handle 10 is apertured to receive the arm of a crank 13 attached to the other valve plug (not shown), the upper portions of handles 9 and 10 being each provided with a ratchet 14 to coact with a pawl 16 to hold the arm in adjusted position when the apparatus is manually operated.

Means are provided, however, to render pawls 16 inoperative when the surface of the liquid in container 7 reaches the desired level. For this purpose a weight 18 is affixed to a suitably supported shaft 19, and has an arm 20 which is bifurcated to receive a lateral extension 21, of a tube 24, the lateral extension being affixed to the arm 20 by removable means, such as a pin 25. The weight of tube 24 is sufficient to overcome weight 18 and maintain it in the position shown in Fig. 3.

Telescopically arranged within the tube 24 is a rod 26 having a float 27, at one end, and being provided with a rack 28 which projects through a slot in tube 24 and which has an outwardly projecting lug 29 at its upper end which is adapted to engage a block 30 secured to tube 24. The block 30 is adjustably secured to tube 24 in any desired manner, such as by means of a set screw 31, and during operation of the apparatus is set at a point determined by the amount of liquid desired in container 7. The float 27 extends into a float chamber 32 which is in communication with the liquid in container 7, and when the container 7 is empty or the surface of the liquid in the container 7 is low, the lug 29 is spaced from the block 30 as shown in Fig. 1 of the drawings. When either or both of the valves are opened, however, and the liquid rises in container 7 and in float chamber 32 to the desired level, lug 29 engages block 30 lifting tube 24, which permits shaft 19 to rotate in the clockwise direction, Fig. 3, under the influence of weight 18. As shaft 19 rotates, cams 33 affixed to shaft 19 engage arms 34 attached to pawls 16 and lift them out of engagement with ratchets 14. It will be understood, however, that during the manual operation of the device, arm 34 may be manually operated at any time to raise pawls 16, irrespective of the level of liquid in the container.

The drain pipe 8 is normally maintained in open position but may be closed by means of valve 8a provided with a valve stem 35. For the purpose of closing valve 8a rotary switch 36 is moved in counter-clockwise direction to contact terminal 37 and a circuit is established from line L₁ through conductor 38, solenoid 39 and conductors 40 and 41 to line L₂, the energization of solenoid 39 raising the valve stem 35 and closing valve 8a.

While my improved apparatus may be manually operated as just described, the principal purpose of the invention is to provide automatic operation so that fluid having the desired physical properties may be delivered to conduit 4 or container 7, and this is accomplished in accordance with my invention without making substantial changes in the apparatus. For instance, to connect the apparatus for automatic operation, it is only necessary to withdraw pin 25 whereupon tube 24 drops down upon rod 26, and the cams 33 under the influence of weight 18 serve to maintain pawls 16 out of engagement with ratchets 14.

For automatic operation the apparatus includes a movable operating device 50, a diaphragm motor 51 actuated by fluid pressure, means for supplying fluid under pressure to the diaphragm motor, including a source of constant fluid pressure designated generally by the numeral 52, and a source of fluid pressure designated generally by the numeral 53, the pressure of which may be varied by means of a control device 54 and within predetermined limits by means of a vapor system comprising a bulb 55 which is sensitive to the fluid mixture flowing through delivery pipe 4, and a conduit 56 leading to a Bourdon tube 57.

My improved apparatus is associated with the valves of the supply pipes in such a manner that upon downward movement of the operating device to a predetermined extent, one of the valves is fully opened without affecting the normally closed position of the other valve. While as shown in the drawings the valve which is first opened controls the cold water pipe, the apparatus may be so arranged that the valve controlling the hot water pipe may be first opened. Upon further movement of the operating device in the same direction, the other valve is gradually opened and the first valve is permitted to gradually close.

Figure 4:
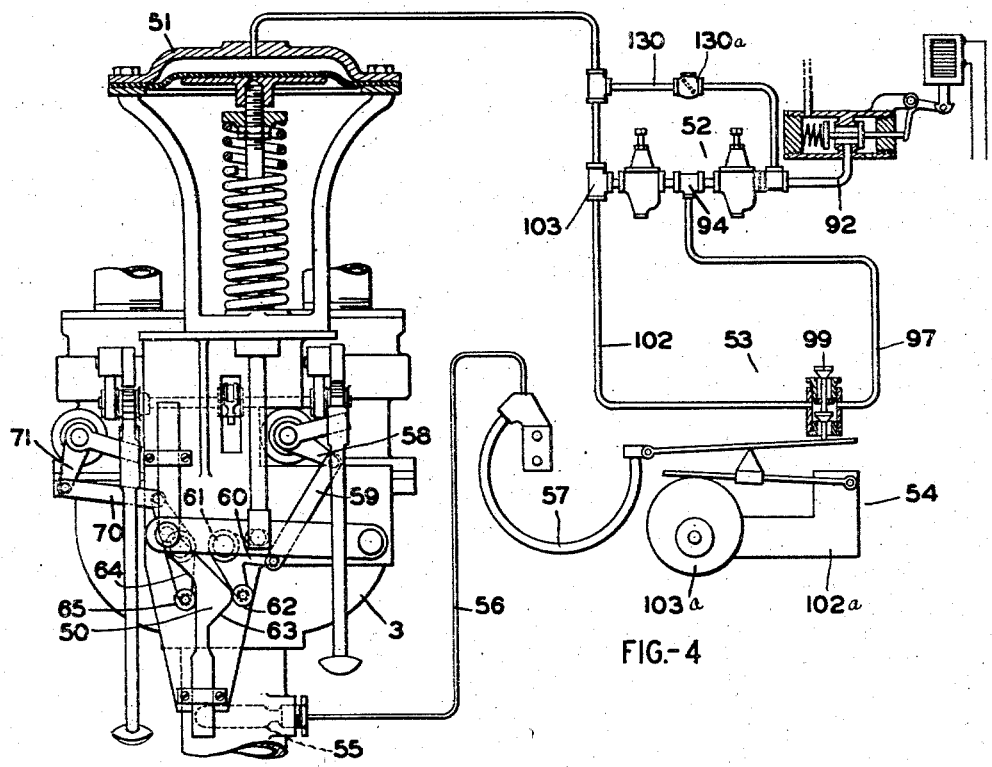
Fig. 4 is a view similar to Fig. 1, the liquid level control means being omitted, the conduit leading to the container being broken away, and the valve-operating device being shown in position to maintain open the valve controlling one fluid supply source, the valve controlling the other fluid supply source being closed.

To effect this operation, the stem of the cold water valve is provided with a crank 58 to which one end of a link 59 is connected, the other end of link 59 being connected to one arm 60 of a bellcrank lever pivoted to casing 3 at 61, the other arm of the bellcrank being provided with a roll 62 which engages the bevelled or cam edge 63 of operating device 50 as it is moved downwardly, thereby rotating the bellcrank in a counter-clockwise direction and imparting upward motion to the link 59 which raises crank 58 and fully opens the cold water valve as shown in Fig. 4 of the drawings.

Figure 5:
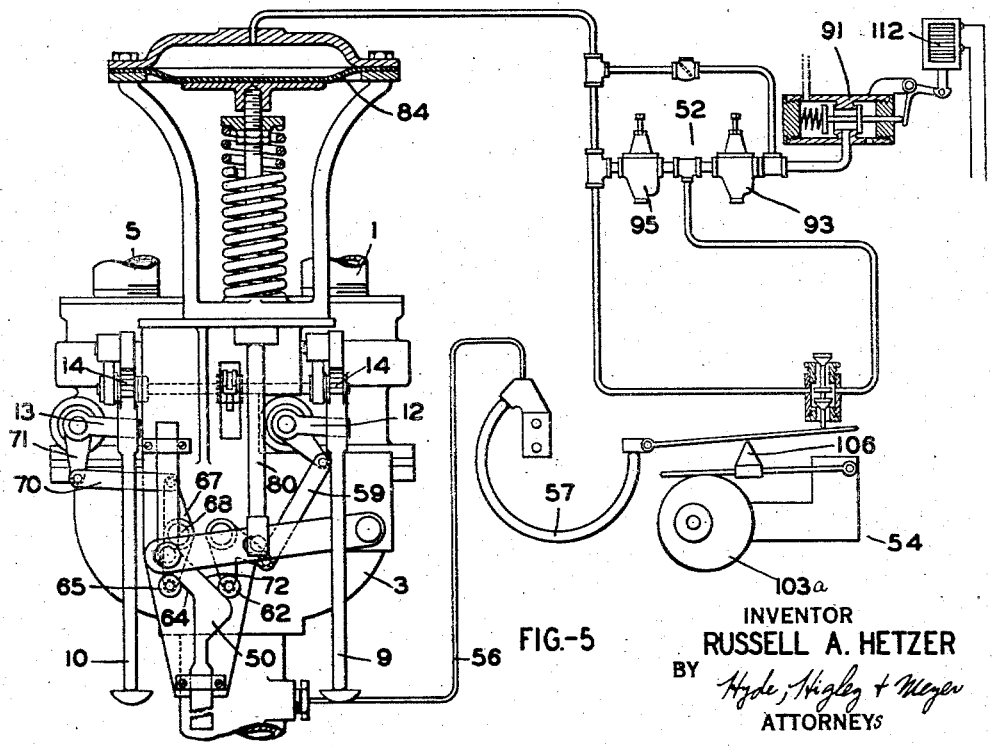
Fig. 5 is a view similar to Fig. 4, showing the valve-operating device in position to maintain partially open the valves controlling both fluid supply sources.

Upon further movement of the operating device in the same direction, as illustrated in Fig. 5, the opposite bevelled or cam edge 64 of the operating device engages a roll 65 carried by one end of a lever 67 pivoted at 68 to casing 3, the other end of the lever being connected to one end of a link 70 and the other end of link 70 being connected to a crank 71 which is attached to the valve stem of the hot water valve. During this movement the hot water valve is gradually opened, roll 62, riding upon cam edge 72 of the operating device which is bevelled in the same direction and at the same angle as face 64, permitting the cold fluid valve to partially close. Both valves are therefore maintained in partially open position.

Upon still further movement of the operating device in the same direction to the position shown in Fig. 6, roll 65 fully opens the hot water valve and permits the cold water valve to completely close. It will be noted that movement of operating device 50 from the position shown in Fig. 1 to the position shown in Fig. 6, or from the position shown in Fig. 6 to the position shown in Fig. 1, regulates the proportionate amount of hot and cold liquid which flows through pipes 1 and 5, the combined flow of liquid, however, being maintained constant.

Operating device 50 is normally maintained in inoperative position by any suitable means. As shown in the drawings the cam portion of operating device 50 terminates in an upwardly extending arm 73 which passes through a guide 74 and at its lower portion is provided with a downwardly extending arm 75 which passes through a guide 76. At the junction 77 of the cam portion of the operating device with the upwardly extending arm, the operating device is connected to one end of a lever 78, pivoted at 79 to casing 3, said lever being operated by a reciprocating rod 80 which passes through a bushing 81 in a bracket 82 and is threaded at its upper end to the hub of a plate 83 which bears against the diaphragm 84 of diaphragm motor 51. Rod 80 is normally maintained in elevated position and diaphragm 84 is held in engagement with the diaphragm motor casing by a spring 85, one end of which is fitted against a nut 86 threaded on rod 80, and the other end of which surrounds bushing 81 and bears against the lower portion of bracket 82. When pressure is exerted upon the upper side of diaphragm 84, however the diaphragm is forced in the opposite direction, which compresses spring 85 and moves operating device 50 downwardly.

According to my invention means are provided to exert sufficient pressure from a constant source of fluid pressure, upon diaphragm 84 of motor 51 to first move the operating device downwardly to a position to fully open the valve controlling one source of fluid supply, the other valve remaining closed, and to supply additional fluid pressure from a variable source of fluid pressure to regulate the open extent of each valve, to thereby provide a mixture of the fluids in casing 3 and delivery pipe 4 having the desired physical properties. For this purpose conduit 90 connected to a suitable source of fluid under pressure, communicates through a valve casing 91 and a conduit 92 when valve 90a is open with a pressure reducing valve 93 which reduces the line pressure to a predetermined value, say fifteen pounds per square inch. The fluid at this predetermined pressure, flows from reducing valve 93 to a union 94, at which point a portion of the fluid flows through circuit 52 and a portion flows through the circuit 53. The portion of the fluid flowing through circuit 52 is further reduced in pressure to a predetermined amount, say seven and one-half pounds per square inch, by means of a reducing valve 95, and consequently when valve 90a in valve casing 91 opens communication between conduit 90 and pressure reducing valve 95, a constant pressure is provided through the circuit 52 to expand diaphragm 84 a sufficient amount to move the operating device to the position shown in Fig. 4 of the drawings, in which position the valve controlling the flow of liquid in the cold water pipe is open and the valve controlling the flow of liquid in the hot water pipe is closed.

Further downward movement of the operating device is effected by means of fluid pressure passing through circuit 53 having a conduit 97 which is connected to circuit 52 at junction 94, the other end of conduit 97 leading into a valve casing 98 provided with exhaust ports which are controlled by valve means including valve heads 99 and 100 connected to a movable valve stem 101, said valve means being adapted upon upward movement to partially or fully open the exhaust ports of the casing. A conduit 102 leads from the opposite side of the casing to a junction 103 with circuit 52. The circuit 53 is so arranged that when the exhaust ports are fully open, fluid under pressure in circuit 53 is dissipated and only the pressure of the fluid from circuit 52 is effective upon the diaphragm 84. It will be noted that conduit 92 is considerably larger than conduit 102 and that the fluid pressure in conduit 97 is greater than the fluid pressure in conduit 92 at junction 103. The amount of fluid which leaks through conduit 102 from circuit 52 when valves 99 and 100 are fully open, will therefore be negligible and will not materially affect the pressure of fluid from circuit 52 upon diaphragm 84.

When valve heads 99 and 100 move downwardly a limited extent, the exhaust ports in valve casing 98 are partially closed and fluid at a higher pressure, say at approximately eleven pounds per square inch, from circuit 53 is effective upon the diaphragm 84. Operating device 50 is therefore moved downwardly a sufficient extent to partially open the hot water valve and to permit the cold water valve to partially close. When valve heads 99 and 100 move downwardly a sufficient extent to fully close the exhaust ports, further pressure is exerted upon diaphragm 84 from circuit 53 and operating device 50 is moved downwardly still further, thereby fully opening the hot water valve and permitting the cold water valve to fully close.

While any suitable means may be provided for regulating the amount of pressure flowing through circuit 53, a control device 54 is shown for maintaining the valve heads 99 and 100 in the desired position. As shown, the control device includes a frame 102a to one end of which an eccentric 103a is adjustably secured by any suitable means, such as a nut 104. A lever 105 provided with a fulcrum 106, is pivotally secured to the other end of frame 102a, the opposite end of the lever riding upon eccentric 103a. Fulcrum 106 supports a lever 107, one end of which is pivotally connected to Bourdon tube 57 and the free end of which is adapted under predetermined conditions to engage valve stem 101.

When eccentric 103a is set in the cold water position as shown in Figs. 1 and 4, fulcrum 106 is raised in a substantially vertical direction and the free end of lever 107 engages the stem 101, fully opening the exhaust ports of casing 98 and allowing fluid in the circuit 53 to dissipate to the atmosphere. Pressure exerted upon diaphragm 84 is therefore all supplied from circuit 52 and actuating device 50 is moved to a position which opens the cold water valve, the hot water valve remaining closed. In such a case cold water only is delivered to chamber 3, delivery conduit 4 and container 7. If water of a moderate temperature is desired, eccentric 103a is moved in a clockwise direction from the position shown in Figs. 1 and 4 to the desired extent, such as to the position shown in Fig. 5 which lowers fulcrum 106 from its position as shown in Figs. 1 and 4. In this position valve heads 99 and 100 partially close the exhaust ports of casing 98 and sufficient pressure is supplied from circuit 53 to diaphragm 84 to move operating device 50 downwardly a sufficient extent to partially close the cold water valve and to maintain the hot water valve in partially open position. When hot water is desired, eccentric 103a is moved further in a clockwise direction, such as to the position shown in Fig. 6 which still further lowers the fulcrum 106 from its position as shown in Fig. 6 and permits valve heads 99 and 100 to fully close. All the pressure of the fluid in circuit 53 is therefore exerted against diaphragm 84 and operating device 50 is moved to the position shown in Fig. 6 in which the hot water valve is fully opened and the cold water valve is permitted to completely close.

Means are also provided to maintain the liquid delivered through pipe 4 at the desired temperature irrespective of variations in the temperature or pressure of either source of supply. For instance, if the temperature or pressure of the hot water supply should vary, thereby upsetting the ratio, means are provided to compensate for this variation. As shown in the drawing, bulb 55 extends into delivery pipe 4 and is connected through conduit 56 to the Bourdon tube 57, although if desired bulb 55 may be located in casing 3 or container 7. The bulb 55, conduit 56 and Bourdon tube 57 are a vapor system containing a suitable gas. Now, assuming for instance that the operating device is in the position shown in Fig. 4, and that the water is colder than that desired and for which Bourdon tube 57 is set, in such case, the Bourdon tube contracts, moving lever 107 in a clockwise direction about fulcrum 106, and allows valve heads 99 and 100 to partially close the exhaust ports of casing 98. Additional pressure is therefore exerted upon the diaphragm 84 which moves operating device 50 downwardly to partially open the hot water valve and partially close the cold water valve. On the other hand, assuming that the control device 54 is set in the position shown in Fig. 5 and the pressure in the cold water pipe varies, providing water in conduit 4 from the hot and cold water supply pipes which is hotter than that desired and expected. In such case Bourdon tube 57 expands, moving lever 107 in a counterclockwise direction about fulcrum 106, partially opening the exhaust ports in casing 98 and diminishing the pressure on diaphragm 84. Operating device 50 therefore rises under the influence of spring 85, increasing the open extent of the cold water valve and decreasing the open extent of the hot water valve.

In the event that it is desired to first fully open the valve controlling the hot water pipe, the position of operating device 50 may be changed so that the bevelled portion 63 engages roll 65 to first fully open the hot water valve, or the supply line connections may be reversed so that cold water flows through pipe 5 and hot water flows through pipe 1. To regulate valves 99 and 100 to compensate for variations in the temperature or pressure of the sources of supply in such a case, it is necessary to invert Bourdon tube 57 so that expansion of the tube rotates lever 107 in a clockwise direction about fulcrum 106 to permit valve heads 99 and 100 to close, thereby increasing the pressure on diaphragm 84 which increases the open extent of the valve controlling the cold water supply and decreases the open extent of the hot water valve, and contraction of the tube operates lever 107 in a counterclockwise direction to open valve heads 99 and 100, thereby decreasing the pressure on diaphragm 84 which increases the open extent of the valve controlling the hot water supply and decreases the open extent of the valve controlling the cold water supply.

When the apparatus is employed for controlling and regulating the delivery of a brine solution from a water and a saturated salt solution sources of supply, variations in the pressure of the water supply or variations in the pressure or strength of the salt solution may be regulated in a similar manner, the valve heads 99 and 100 being controlled in such a case by variations in electrical conductivity of the brine solution flowing through conduit 4. In a like manner other physical properties of the fluid delivered to the conduit 4 may be utilized to control the movement of valve heads 99 and 100. For instance, the apparatus might be employed to control and regulate the delivery of oil having a desired viscosity from two sources of supply, one of which is of the maximum viscosity and the other of which is of the minimum viscosity, in which case a viscosimeter may be employed to operate valve heads 99 and 100 to provide a liquid having the desired viscosity. The apparatus may also be employed for controlling and regulating the mixture of two fluids supplied from different sources which have different specific gravities or different relative densities, in which case variations in the specific gravity or relative density of the mixture delivered through conduit 4 can be employed to operate valve heads 99 and 100 to compensate for variations in the specific gravity or relative density of fluid supplied from the two different sources.

During the operation of the device the valve 90a may be held open by any convenient means. As shown in the drawings, when switch 36 is rotated to make contact with terminal 108 a current is established from line L₁ through conductor 109, mercury switch 110, conductor 111, solenoid 112 and conductor 113 to line L₂, thus energizing solenoid 112. At this time the opposite end of switch 36 engages terminal 108a which closes valve 8a. When solenoid 112 is energized, its armature 114 which is attached to one arm of a bellcrank lever 115 pivotally mounted on a bracket 116 on the valve casing, is forced downwardly, opening valve 90a to provide communication between conduit 90 and conduit 92.

Means are also provided during the automatic operation of the device to shut off the supply of liquid to container 7 when the surface of liquid in the container reaches a predetermined level. For this purpose the rack 28 on rod 26 meshes with a gear 117 operatively connected to rotate a contactor 118 on a dial 119 provided with a plurality of terminals 120 which are electrically connected by means of conductors 121 with terminals 122 on a dial 123 provided with a contactor 124 which is adapted to be manually set in engagement with one of the terminals 122 in accordance with the amount of liquid desired in container 7.

When the surface of the liquid in container 7 rises to the desired level as determined by the setting of contactor 124, a circuit is established, from line L₁ through conductors 109 and 125a, contactor 124, terminal 122, conductor 121, contactor 118 and conductor 126 to solenoid 125 and from thence through conductors 127 and 41 to line L₂. The armature of solenoid 125 is secured to the arm 128 of a pivotally mounted bracket which is secured to mercury switch 110 and when solenoid 125 is energized, mercury switch 110 is rotated in a counterclockwise direction, thus breaking the circuit to solenoid 112, whereupon spring 129 forces valve 90a closed and fluid from diaphragm motor 51 escapes through conduit 130 controlled by a one-way valve 130a, and from thence to conduit 92 and exhaust port 131 to the atmosphere. When it is desired to drain liquid from the container, switch 36 is rotated in a counterclockwise direction to the position shown in Fig. 1, thereby permitting valve 8a to open. As the liquid drains from the container, float 27 falls and lug 29 finally engages a tongue on the bracket supporting the mercury switch and rotates it in a clockwise direction to reset the apparatus for further operation. It will be particularly noted that the automatic operation of the valves in casings 2 and 6 in the apparatus disclosed in Figs. 1 to 6 inclusive, does not interfere in any manner with their manual operation because when handle 9 is moved upwardly cranks 12 and 58 are moved in a counterclockwise direction and crank 58 acting through link 59 and its associated bellcrank lever moves roll 62 away from operating device 50, and in a like manner when arm 10 is raised crank 71 acting upon link 70 operates lever 67 to move roll 65 away from operating device 50. Either or both of the valves may, therefore, be manually operated when the device is set for automatic operation.

A modified form of my improved apparatus is shown in Figs. 7 and 8 which may be operated by fluid pressure in the same manner as the apparatus shown in Figs. 1 to 6 inclusive. As illustrated, the operating device comprises a bar 135 having an outwardly extending rack 136 at one side and an arm 137 pivoted thereto at 138, the arm 137 being provided at one end with a rack 139 extending outwardly beyond the bar at the side opposite to rack 136 and at the other end with a lug 140. The upper portion of arm 137 is normally held in outward position by any suitable means, such as a spring 141, to maintain rack 139 in a position beyond bar 135 and the lug 140 at the other end normally engages the face 142 of a block 143 having an extending tip 144. As shown in the drawings, the stem of the valve mounted in casing 2 controlling the flow of cold fluid, is provided with a segmental gear 145 which meshes with a segmental gear 146 supported upon valve casing 2. The stem of the valve mounted in casing 6 controlling the flow of hot fluid, is also provided with a segmental gear 147 which meshes with a segmental gear 148.

In this modification, when the operating device is moved downwardly, rack 139 on arm 137 first engages segmental gear 145 which fully opens the valve controlling the flow of cold fluid and lug 140 on arm 137 moves in contact with tip 144 causing rack 139 to mesh with segmental gear 146 as it leaves segmental gear 145. Upon further downward movement, rack 136 meshes with segmental gear 148 which rotates segmental gear 147 to partially open the valve controlling the flow of hot fluid, and segmental gear 146 rotates segmental gear 145 in a clockwise direction to partially close the valve controlling the flow of cold fluid. As the operating device is moved farther downward, the valve controlling the flow of cold fluid is gradually closed and the valve controlling the flow of hot fluid is gradually opened until the hot fluid valve is fully opened and the cold fluid valve is fully closed. This position is shown in Fig. 8 of the drawings. Operating device 135 is moved to and maintained in normally inoperative position and actuated in the same manner as operating device 50 shown in Figs. 1 to 6 inclusive, of the drawings.

A further modification of my invention is shown in Fig. 9, in which means are provided to maintain the liquid in container 7 at the desired temperature. The apparatus disclosed in Fig. 9 is particularly adapted for controlling and regulating the supply of liquid to washing or cleaning machines and maintaining the liquid delivered to the machine at the desired temperature although it may be utilized for other purposes, such as supplying liquid to storage tanks from which liquid is being intermittently withdrawn and in which it is desired to maintain the liquid at a desired constant temperature. In this modification when switch 36 is rotated clockwise to connect terminal 108 to the line, a circuit is established from line L₁ through conductors 150, 151, solenoid 152 and conductors 153 and 154 to line L₂, the energization of solenoid 152 serving to open circuits 52 and 53 to a source of fluid under pressure and the opposite end of switch 36 engages terminal 108a which closes valve 8a. A circuit is also established through conductor 109, mercury switch 110, conductors 111 and 155, coil 156 and conductors 157 and 41 to line L₂, which energizes coil 156 and raises a switch 158; and in parallel with coil 156 is a circuit which includes conductor 159, solenoid 160 and conductor 161, the armature of said solenoid being connected to one end of a pivotally mounted lever 162, the other end of the lever being connected to a valve stem 163 operating in valve casing 164 and provided with valve heads 165 and 166. When solenoid 160 is energized, valve 165 is closed and valve 166 is opened to provide communication of fluid under pressure from circuit 52 or from circuits 52 and 53 to diaphragm motor 51 which automatically operates the valves in valve casings 2 and 6 to supply liquid to container 7 at the desired temperature in accordance with the setting of control device 54 as previously described.

When the surface of the liquid in container 7 reaches the desired level, solenoid 125 is energized as described in connection with the apparatus shown in Fig. 1, which rotates mercury switch 110 and breaks the circuit to solenoid 160 and coil 156, whereupon spring 167 closes valve 166 and opens valve 165 and switch 158 closes by gravity. The opening of valve 165 permits fluid from motor 51 to exhaust through port 165a and the supply of liquid to tank 7 is shut off. When switch 158 closes, a circuit is established from line L₁, through conductors 150 and 168, solenoid 169, conductor 170, switch 158 and conductors 171, 154 and 41 to line L₂. The energization of solenoid 169 raises armature 172 which is attached to the crank 173 of a rotary valve 174 operating in a casing 175. The rotation of valve 174 connects port 176 in the rotary valve with conduit 102 and a conduit 179 leading to a diaphragm motor 180 which controls the operation of a valve 181 for regulating the supply of a heating medium to container 7. As shown, valve 181 is normally maintained in closed position by means of a spring 182, one end of which seats upon the base of the casing and the other end of which bears against diaphragm 184 to which one end of a rod 185 is secured. The other end of rod 185 is attached to one end of a lever 186 pivotally mounted on a bracket attached to the casing, the other end of the lever being attached to the stem of valve 181. It will be noted that the bulb 55 in this modification is located in container 7.

The control apparatus now operates on a standard hookup. Liquid has been delivered to the container at a predetermined temperature and while the liquid remains at that temperature, the control device 54 through the setting of the eccentric 103a and the effect of the temperature of the liquid in container 1 on the gas in bulb 55 and in Bourdon tube 57 maintains lever 107 and the valves 99 and 100 in a position to allow a sufficient portion of the fluid from conduit 97 to bleed to the atmosphere so that the pressure applied through conduits 102 and 179 is insufficient to move the diaphragm 184 to open valve 181. If the fluid pressure in conduits 102 and 179 should be sufficient to partially open valve 181 when solenoid 169 is energized to allow some of the heating medium to flow through pipe 187, the tendency of the temperature of the liquid to increase above the predetermined temperature would cause the Bourdon tube to expand and operate lever 107 to further open valves 99 and 100, and permit a larger portion of fluid from conduit 97 to bleed to the atmosphere. The pressure of the fluid in conduits 102 and 179 on diaphragm 184 would therefore be decreased, allowing valve 181 to be closed by the action of a spring 182.

As illustrated in the drawings, steam under the control of the valve 181 is utilized as the heating medium which may be passed directly into the washer as shown, or if desired may be passed through a suitable coil. When the steam is passed through the coil, the coil should be arranged in container 7 in such a position that the gas in bulb 55 will not be affected directly by heat radiated from the coil.

Now, if the temperature of the liquid in the container drops as the result of radiation or other losses, the Bourdon tube 57 contracts, moving the lever 107 in a clockwise direction about fulcrum 106, allowing valves 99 and 100 to partially close and permitting fluid under pressure to flow through conduit 102, valve casing 175 and conduit 179 to diaphragm motor 180, thereby opening valve 181 and permitting flow of the heating medium. The liquid in the container 7 is therefore maintained at the predetermined temperature at which it was delivered to the container as long as any liquid is contained therein.

After the standard hookup has been established, it will be apparent that by rotating cam 103a in a counterclockwise direction to the desired extent, the liquid in container 7 may be permitted to cool to any desired temperature before the heating medium is supplied, after which it is maintained at that temperature, and that by rotating the cam in a clockwise direction sufficient heating medium may be supplied to heat the liquid to and maintain it at a higher temperature than that at which it was delivered. The temperature of the liquid in container 7 may therefore be maintained at the temperature at which it was delivered or at any desired temperature.

To drain the liquid from the container, switch 36 is rotated in a counterclockwise direction to the position shown in Fig. 9, and as float 27 descends lug 29 on rack 28 engages a tongue on the bracket supporting mercury switch 110, rotating the switch in a clockwise direction, and a circuit is again established to coil 156, which raises switch 158, thus breaking the circuit to solenoid 169 which permits spring 172 to rotate valve 174 to the position shown in Fig. 9 of the drawings, and the fluid from motor 180 to exhaust through port 188 to the atmosphere. Additional liquid may then be supplied to container 7 at the desired temperature.

What I claim is:

1. Apparatus of the class described comprising first and second sources of fluid supply, separately operable valve means respectively associated with each source and normally maintained in a position to shut off both sources, a movable operating device associated with said valve means, mechanism operated by fluid pressure for moving said operating device, two sources of fluid under pressure communicating with said mechanism, one of the sources of fluid being under sufficient constant pressure to provide a minimum pressure upon said mechanism and to move said valve means to fully open one of said sources of fluid supply, the pressure of the other fluid source being variable and capable of exerting greater pressure upon said mechanism than the pressure from the constant source, and a control device for the variable source of fluid pressure capable of being set in different positions, whereby the pressure exerted upon said mechanism may be varied within limits above the predetermined minimum and said operating mechanism actuated to close the first source of fluid supply any desired extent and to open the second source of fluid supply any desired extent.

2. Apparatus of the class described comprising first and second sources of liquid supply, separately operable valve means associated with each source, a casing having a chamber communicating with both of said sources when the valve means is in a predetermined position, an operating device associated with said valve means, said operating device being adapted upon movement in one direction to fully open the first source to said chamber and upon further movement in the same direction to permit the first source to gradually close and to gradually open the second source to said chamber, and upon reverse movement to open the first source and permit the second source to close, mechanism actuated by fluid pressure connected to said operating device and a source of fluid pressure communicating with said mechanism and having a sufficient minimum pressure to actuate the control device to open the first source of liquid supply to said chamber, and means responsive to the temperature of the liquid in said chamber fc varying the fluid pressure within predetermined limits above said minimum pressure, thereby regulating the volume of liquid passing into said chamber from each source of fluid supply.

3. Apparatus of the class described comprising a conduit means, a valve of the self-closing type controlling said conduit means, a gear connected to the stem of said valve, a second gear in mesh with the valve stem gear, a movable operating device having a rack associated therewith, means for forcing said rack into meshing engagement with the valve stem gear as the operating device is moved a predetermined extent in one direction to thereby open said valve, and mans whereby said rack is forced into meshing engagement with the second gear simultaneously with its travel out of meshing engagement with the valve stem gear upon further movement of the operating device in the same direction, thereby permitting a gradual opening of the valve during the first movement of the operating device and a gradual closing of said valve during further movement of said operating device in the same direction.

4. Apparatus of the class described comprising first and second sources of fluid supply, valve means associated therewith which is normally maintained in a position to shut off both sources, a casing having a chamber communicating with both sources, a movable device provided with cam faces, there being cam following connections to said valve means, said connections being so constructed and arranged that upon movement of said device in one direction to a predetermined extent said connections fully open one of said sources of supply without affecting the closed position of the other source and upon its continued movement in the same direction said connections permit the first source to gradually close and gradually open the second source, whereby proportionate amounts of fluid having different properties may flow from the sources of supply to said chamber, a mechanism operated by fluid under pressure for moving said operating device, and means responsive to the physical properties of the mixture of fluid in said chamber for varying the amount of fluid pressure upon said mechanism.

5. Apparatus of the class described comprising first and second sources of fluid supply, valve means associated therewith which is normally maintained in a position to shut off both sources, a casing having a chamber communicating with both sources, a movable device provided with operating connections including cam faces on said device and cam followers linked to said valve means, said connections being so constructed and arranged that upon movement of said device in one direction to a predetermined extent said connections fully open one of said sources without affecting the closed position of the other source and upon its continued movement in the same direction permit the first source to gradually close and gradually open the second source, fluid actuated mechanism for moving said operating device, a source of fluid under constant pressure for actuating said mechanism a sufficient extent to fully open the first source of fluid supply, a second source of fluid under pressure communicating with said mechanism, a control device for varying the pressure from the second source, and means responsive to the physical properties of the mixture of fluids in said chamber for effecting further variation in the fluid pressure exerted upon said mechanism.

6. Apparatus of the class described comprising first and second sources of fluid supply each having a control valve which is normally maintained in closed position, a reciprocating device, an operative connection from one side of said device to one of said valves, and a second operative connection from the other side of said device to the other valve, the first of said operative connections being disposed, upon movement of said control device, to fully open the valve controlling the first source without affecting the second connection, and upon continued movement of said reciprocating device in the same direction, to cause gradual movement of the first connection and its associated valve to shut off the first source, while simultaneously actuating the second connection to gradually open the valve controlling the second source.

7. Apparatus of the class described comprising first and second sources of fluid supply, each having a valve which is normally maintained in closed position, a reciprocating device having a cam on one edge which terminates in an inclined face, the other edge of said device having a substantially straight face which terminates in an inclined cam face which is substantially parallel with the inclined face of said first mentioned cam, movable connections to each of said valves, the connections to the valve controlling the first source being actuated by said first mentioned cam, and the connections to the valve controlling the second source being actuated by said second mentioned cam, said first mentioned cam being effective upon movement of the device in one direction to actuate the connections to fully open the valve controlling the first source, and thereafter upon continued movement to close said valve, and said second mentioned cam upon further movement of said device in the same direction being disposed to open the valve controlling the second source simultaneously with the closing of the valve in said first mentioned source.

8. Apparatus of the class described comprising first and second sources of fluid supply, valve means associated therewith which is normally maintained in position to close both sources, a movable operating device provided with cam faces associated with cam followers linked to said valve means, said cams and followers being so positioned that upon movement of said device to a predetermined position in one direction, said linkage operates the valve means to fully open the first source without affecting the closed position of the second source, and upon continued movement of the device in the same direction, said linkage permits the first source to close and causes the second source to open, and means for moving said operating device including a constant source of fluid pressure for moving said device to a position in which said linkage opens the first source, and a variable source of fluid pressure for moving the actuating device beyond the first position, and means for controlling the variable source of fluid pressure to maintain both sources of supply in a partially open position.

RUSSELL A. HETZER.